Patented Oct. 6, 1925.

1,556,022

UNITED STATES PATENT OFFICE.

ARON L. PENNER, OF WINNIPEG, MANITOBA, CANADA, ASSIGNOR OF ONE-HALF TO JACOB F. FROESE AND ONE-HALF TO JOHN F. FROESE, BOTH OF REINLAND, MANITOBA, CANADA.

ALUMINUM SOLDER.

No Drawing. Application filed July 21, 1924. Serial No. 727,322.

*To all whom it may concern:*

Be it known that I, ARON L. PENNER, a citizen of Canada, residing at Winnipeg, in Manitoba, Canada, have invented certain new and useful Improvements in an Aluminum Solder; and I do hereby declare the following to be a full, clear, and exact description of the invention, such as will enable others skilled in the art to which it appertains to make and use the same.

This invention relates to a solder and particularly to a solder adapted to be used with aluminum articles or articles made from aluminum alloy. As is well known, the ordinary solder is not suitable for soldering aluminum. While various solders have been proposed for this purpose, they have, as a rule, not been successful.

It is an object of this invention to provide a solder which is easily made and which is very efficient when applied to aluminum articles.

It is a further object of the invention to provide such a solder which can be formed into bars or sticks and marketed in this form.

The solder of the present invention preferably includes the following metals, lead, tin, zinc, aluminum and antimony. These metals are used in the following proportions by weight: lead 13 parts, tin 11 parts, zinc 4 parts, aluminum ¼ part, antimony 1 part.

To prepare the solder, the proper amounts of lead and tin are first placed in the melting pot and heated sufficiently to be melted and mixed together. After the molten mixture has been stirred and mixed to form a uniform product the proper amounts of zinc, aluminum and antimony are added and melted with the other metals. The mixture is then again stirred until a uniform mixture is obtained and the mixture is then poured into the proper molds to form sticks or bars and allowed to cool and harden.

In using the solder on aluminum the surface of the article should be well cleansed from dirt and grease and the same then preferably rubbed with a sperm candle. After the surface has thus been treated, the solder is applied in the usual way with a hot soldering iron. The sperm candle acts as a flux and assists in the adhesion of the solder to the metal.

The solder of the present invention has been amply demonstrated in actual practice and found to be very efficient. The same is very easily applied and can be used by anyone familiar with the use of a soldering iron.

It will, of course, be understood, that various changes may be made in the ingredients and relative amounts thereof without departing from the scope of applicant's invention which, generally stated, consists in such a material and method as above set forth and defined in the appended claim.

What is claimed is:

An aluminum solder comprising the following metals in substantially the following relative parts by weight, respectively: lead, 13 parts, tin, 11 parts, zinc, 4 parts, aluminum, ¼ part, antimony, 1 part.

In testimony whereof I affix my signature.

ARON L. PENNER.